UNITED STATES PATENT OFFICE.

EUGEN SEEL, OF STUTTGART, GERMANY, ASSIGNOR TO FARBENFABRIKEN OF ELBERFELD CO., OF NEW YORK, N. Y., A CORPORATION OF NEW YORK.

ALOIN DERIVATIVE AND PROCESS OF MAKING SAME.

SPECIFICATION forming part of Letters Patent No. 698,746, dated April 29, 1902.

Application filed January 23, 1902. Serial No. 90,997. (No specimens.)

*To all whom it may concern:*

Be it known that I, EUGEN SEEL, doctor of philosophy, chemist, residing at Stuttgart, Germany, (assignor to the FARBENFABRIKEN OF ELBERFELD COMPANY, of New York,) have invented a new and useful Improvement in New Pharmaceutical Compounds and Processes of Making Same; and I hereby declare the following to be a clear and exact description of my invention.

My invention relates to the production of a new derivative of aloin, being most probably a hydrated methyltrioxyanthraquinoneoxid.

According to my researches this new compound can be easily obtained by treating one part of aloin with from three to five parts of a persulfate, such as persulfate of potassium, persulfate of ammonium, or the like. The new body thus obtained possesses a great therapeutic value as a purgative. The average dose employed for this purpose is about one gram.

In carrying out my new process practically I can proceed as follows, the parts being by weight: A watery solution prepared from one part of aloin and four parts of potassium persulfate is heated to boiling for some time. After cooling the yellowish-red powder which is precipitated during the reaction is filtered off and dried. In contradistinction to aloin the new body is nearly insoluble in absolute alcohol, acetone, and water. It is soluble in alkalies with a reddish-brown color and soluble with a red color in concentrated sulfuric acid. On being heated it turns brown at about 230° centigrade, but it does not melt below 360° centigrade.

Having now described my invention and in what manner the same is to be performed, what I claim as new, and desire to secure by Letters Patent, is—

1. The process for the production of a new derivative of aloin, which process consists in at first treating aloin with a persulfate and then isolating the new product, substantially as described.

2. The herein-described new derivative of aloin being a yellowish-red powder which is nearly insoluble in absolute alcohol, water and acetone, soluble in alkalies with a reddish-brown color, being soluble with a red color in concentrated sulfuric acid and being a valuable remedy, substantially as described.

In testimony whereof I have signed my name in the presence of two subscribing witnesses.

EUGEN SEEL.

Witnesses:
ERNST RIEGEL,
ERNST ENTSMUND.